US009194762B2

(12) United States Patent
Jurca

(10) Patent No.: US 9,194,762 B2
(45) Date of Patent: Nov. 24, 2015

(54) MACHINING HEAD FOR A LASER MACHINING APPARATUS

(71) Applicant: Alsitec s.a.r.l., Hagenau (FR)

(72) Inventor: Marius Jurca, Eching (DE)

(73) Assignee: Alsitec s.a.r.l., Hagenau (FR)

( * ) Notice: Subject to any disclaimer, the term of this patent is extended or adjusted under 35 U.S.C. 154(b) by 14 days.

(21) Appl. No.: 14/282,706

(22) Filed: May 20, 2014

(65) Prior Publication Data

US 2014/0347655 A1    Nov. 27, 2014

(30) Foreign Application Priority Data

May 21, 2013   (DE) .......................... 10 2013 008 645

(51) Int. Cl.
*G01M 11/02*   (2006.01)
*B23K 26/04*   (2014.01)
*G02B 27/40*   (2006.01)

(52) U.S. Cl.
CPC ......... *G01M 11/0207* (2013.01); *B23K 26/046* (2013.01); *G02B 27/40* (2013.01)

(58) Field of Classification Search
CPC .............. G01B 11/026; G01B 11/043; G02B 27/0006; B23K 26/046; B23K 23/026; B23K 26/04; B23K 26/048; B23K 26/0807; B23K 26/0665
USPC ............ 356/125, 624, 121–123; 219/121.81, 219/121.74; 250/201.2, 201.4
See application file for complete search history.

(56) References Cited

U.S. PATENT DOCUMENTS

| 6,353,203 | B1* | 3/2002 | Hokodate et al. ........ 219/121.67 |
| 8,450,639 | B2  | 5/2013 | Reitemeyer et al. |
| 8,593,623 | B2* | 11/2013 | Levecq et al. ................. 356/125 |
| 2010/0276403 | A1 | 11/2010 | Reitemeyer et al. |
| 2012/0188365 | A1* | 7/2012 | Stork .............................. 348/90 |
| 2013/0001208 | A1 | 1/2013 | Jurca |
| 2013/0044371 | A1* | 2/2013 | Rupp et al. .................... 359/432 |
| 2014/0346155 | A1* | 11/2014 | Jurca ........................ 219/121.74 |
| 2014/0346156 | A1* | 11/2014 | Bischof .................... 219/121.74 |

FOREIGN PATENT DOCUMENTS

| DE | 102009059245 | 6/2011 |
| DE | 102011054941 | 1/2013 |
| DE | 102012001609 | 2/2013 |
| EP | 2216129 | 8/2010 |
| JP | S61-137693 | 6/1986 |
| JP | H02-204701 | 8/1990 |
| JP | H05277775 | 10/1993 |
| WO | WO2009153067 | 12/2009 |

* cited by examiner

*Primary Examiner* — Hoa Pham
(74) *Attorney, Agent, or Firm* — Lempia Summerfield Katz LLC

(57) ABSTRACT

A machining head of a laser machining apparatus comprises focusing optics which focus laser radiation. A measuring device measures changes of the focal length of the optics. The measuring device has a light source for generating measuring light different from the laser radiation. A light-exit window for the measuring light is imaged, with assistance of the focusing optics or a part thereof, onto a reflecting reference surface arranged to be stationary relative to the exit window and the focusing optics. A light sensor detects measuring light that has emerged from the exit window, has passed through the focusing optics or the part thereof, was reflected on the reflecting surface, and has again passed through the focusing optics or the part thereof. An evaluating device ascertains the change in the focal length of the focusing optics from measuring signals made provided by the light sensor.

18 Claims, 6 Drawing Sheets

MACHINING HEAD FOR A LASER MACHINING APPARATUS

CROSS-REFERENCE TO RELATED APPLICATIONS

This application claims benefit of German patent application Ser. No. 102013008645.0 filed May 21, 2013. The full disclosure of this earlier application is incorporated herein by reference.

BACKGROUND OF THE INVENTION

1. Field of the Invention

The invention relates to a machining head for a laser machining apparatus with which workpieces can be welded, cut, or machined in some other way.

2. Description of Related Art

Laser machining apparatuses ordinarily include a laser radiation source which may be, for example, a Nd:YAG laser, a fibre laser, a disk laser or a $CO_2$ laser. A laser machining apparatus further includes a machining head, which focuses the laser radiation generated by the laser radiation source in a focal spot, and a beam-feed device which feeds the laser radiation generated by the laser radiation source to the machining head. The beam-feeding device may in this case include optical fibres or other light guides and/or one or more deflecting mirrors with plane or curved surfaces. The machining head may have been fastened to a mobile robot arm, whereas the laser radiation source is located outside the robot.

For the purpose of focusing the laser radiation in a focal spot, as a rule the machining head contains focusing optics. The latter include, besides lenses and/or mirrors, also one or more interchangeable protective discs which protect the sensitive optical elements of the focusing optics against contamination. The contamination may, in particular, be caused by splashes of material arising at the machining point or by smoke.

Above all when the laser radiation has a relatively low beam quality, as a rule it is fed to the machining head as a collimated beam with a relatively large diameter (20 mm to 100 mm). Laser radiation with higher beam quality, such as is generated, in particular, by fibre lasers and disk lasers, can also be fed to the machining head via an optical fibre. At a fibre plug the laser radiation emerges with relatively little divergence and is then collimated by a collimating lens in such a way that a beam with a $1/e^2$ diameter from about 15 mm to 20 mm arises.

Above all in the last-mentioned case, i.e. in the case of lasers with high power and good beam quality, locally very high intensities appear in the focusing optics. Particularly when the focusing optics contain lenses and other refractive optical elements such as protective discs, the unavoidable residual absorption in the lens materials that are used has the result that the elements heat up. This is accompanied by a change of shape as a consequence of the thermal expansion. In this way, even protective discs, which at room temperature act optically as a plane-parallel plate, may have a collecting action after the heating.

By virtue of the heating, the refractive power of the optical elements in question consequently changes, which has an effect on the shape and, above all, on the axial position of the focal spot generated by the focusing optics. Measurements have shown that the focal spot, particularly in the start-up phase, i.e. after the start of the laser machining, is displaced by several millimeters (typically 5 mm to 15 mm) in the axial direction. The temporal progression and the final value of the displacement depend on the beam power, on the beam quality and on the thermal properties of the optical components. Only when after several seconds or even several minutes a steady state has been attained, in which the distribution of heat in the optical elements of the focusing optics no longer changes appreciably, does the position of the focal spot remain constant to some extent.

By virtue of the unintended displacement of the focal spot, the workpieces may no longer be machined in the desired manner. If the workpiece is located outside the focal spot, the requisite energy densities for fusing metals, for example, are no longer attained, leading to the interruption of cutting procedures and, in the case of welding, to seam defects.

It is in fact known in the state of the art to monitor the machining region on the workpiece with the aid of individual sensors or cameras. However, as a consequence of the strong emissions of light in the region of interaction with the laser radiation it is difficult to register, unambiguously and in real time, changes of position of the focal spot with the requisite accuracy and independently of the machining process, and thereby to avoid machining defects.

Even when the focusing optics contain mirrors for focusing instead of lenses, changes of position of the focal spot may occur, particularly in the start-up phase. A (to begin with, small) portion of the laser radiation is not reflected by the reflecting coating of the mirror but penetrates into said coating and the underlying mirror substrate, which, for example, may consist of glass or copper, and is absorbed there. As in the case of lenses, the heating of the reflecting coating leads to a detuning of the layered system, which results in an increased absorption. Also in the case of mirrors the focal length is shortened, but much more quickly and much less than in the case of transmissive optical components, since the thermal conductivity of the mirror materials that are ordinarily used (e.g. copper) is very high. Besides the axial displacement of the focal spot, the high-energy laser radiation can also induce other imaging errors in the optical elements of the focusing optics. Such imaging errors may lead to a blurring of the focal spot, which likewise has a disadvantageous effect on the quality of the machining.

From JP S61-137693 A a refractive-power-measuring device for a laser machining apparatus is known, wherein a source of measuring light directs a collimated beam of measuring light via a plane deflecting mirror onto a converging lens of focusing optics. After passing through the converging lens the measuring light is focused in a focal plane of the converging lens, in which a point diaphragm has been arranged. Downstream of the pinhole diaphragm a light sensor has been arranged which registers the intensity of the measuring light that has passed through the pinhole diaphragm. If as a consequence of a heating of the converging lens the focal length thereof changes, the quantity of light registered by the sensor decreases. The axial positions of the pinhole diaphragm and of the converging lens are repositioned in a manner depending on the sensor signals. Since the respective position of the focal point at which the measuring light is focused always has to be sought anew in the event of a change in the focal length of the converging lens, the control system reacts relatively sluggishly.

From JP H02-204701 A a system is known with which the shape of a mirror that has been exposed to a laser beam can be kept constant independently of the thermal loading thereof. For this purpose, measuring light that was reflected from a specular surface is registered by a photodetector. Depending on the measuring signals, piezoelectric elements that have been fastened on the reverse side of the mirror are driven in such a way that they cancel a thermal change of shape registered by the measuring light.

From EP 2 216 129 A1 a laser machining head is known with integrated sensor device for monitoring the focal position. In the machining head a small portion of the laser radiation is coupled out of the collimated beam path between two converging lenses with the aid of a beam splitter and is coupled obliquely into the beam path via a collecting mirror in such a way that it passes through one of the two converging lenses of the focusing optics and an adjacently arranged protective disc. The collecting action of said mirror and of the converging lens has been established in such a way that the portion of the laser radiation coupled out for the measurement is focused, after passing through the converging lens and the protective disc, in a light sensor which takes the form of a CCD area sensor. If the refractive power of the converging lens and of the protective disc changes, the size of the focal spot on the sensor changes. Depending on the intensity distribution on the sensor, a traversing motion of the other converging lens is driven, in order to correct the position of the machining point (tool center point, TCP).

A disadvantageous aspect of this known measuring arrangement is that intense retroreflections from the workpiece can likewise, by virtue of repeated retroreflection on the input-side converging lens, get onto the light sensor and thereby falsify the results of measurement. In addition, the measuring device requires a relatively large additional construction space, although it is not capable of registering all the optical elements of the focusing optics.

From DE 10 2011 054 941 B3 a machining head of a laser machining device is known wherein a portion of the laser radiation that is reflected from the last or penultimate optical element of the focusing optics is coupled out of the beam path of the laser radiation via an outcoupling mirror and is focused in an image sensor via a converging lens. If the refractive power of the focusing optics changes as a consequence of heating, the focal point of the reflected laser radiation is also displaced. Since, however, light is also reflected from the workpiece to be machined, it is difficult to detect the weak retroreflection of said optical element among the large number of other reflections.

SUMMARY OF THE INVENTION

It is the object of the invention to specify a machining head of a laser machining apparatus, with which undesirable displacements of the focal spot or other imaging errors of the focusing optics can be detected in good time and with high accuracy.

This object is achieved by a machining head for a laser machining apparatus which has been set up for the machining of workpieces with laser radiation. The machining head exhibits focusing optics which focus laser radiation fed to the machining head in a focal spot. In accordance with the invention the machining head exhibits a measuring device for measuring changes in the focal length of focusing optics. The measuring device includes a light source which has been set up for generating measuring light that is different from the laser radiation. The measuring device further includes a light-exit window from which the measuring light emerges during operation of the measuring device. The light-exit window is imaged exclusively, or at least with the assistance of the focusing optics or of a part thereof, onto a reflecting surface which has been arranged to be stationary relative to the light-exit window and the focusing optics, and is not part of the focusing optics. The measuring device includes, in addition, a light sensor which has been set up for registering measuring light that has emerged from the light-exit window, has passed through the focusing optics or the part thereof, was reflected on the reflecting surface, and has again passed through the focusing optics or the part thereof. In the process the measuring light impinges at least partly onto regions of optical surfaces of the focusing optics onto which the laser radiation also impinges. An evaluating device of the measuring device has been set up to ascertain the change in the focal length of the focusing optics from measuring signals made available by the light sensor.

The invention makes use of the principle, known as such in the state of the art, of registering measuring light with a light sensor after it has passed through the focusing optics or parts thereof. If the focal length of the parts of the focusing optics passed through by the measuring light changes, this also influences the measuring light that is registered by the light sensor.

In contrast to the known measuring devices, however, in accordance with the invention use is made of measuring light that is different from the laser radiation. Perturbations of the measurement by laser radiation that was reflected on optical surfaces of the focusing optics or on the workpiece can be avoided in this way.

The measuring light preferably differs from the laser radiation by virtue of its centre wavelength. As a result, through the use of colour filters or wavelength-selective light sensors it can be ensured in straightforward manner that the light sensor registers only the measuring light and not reflections of the laser radiation. In principle, the measuring light may differ from the laser radiation, alternatively or additionally, by virtue of other properties, for example by virtue of the state of polarisation. In this case, reflections of the laser radiation can be prevented from impinging onto the light sensor with the aid of polarising filters.

By virtue of the fact that the light-exit window is imaged onto the reflecting surface, measuring light reflected on the reflecting surface partly gets back again onto the light-exit window. This opens up the possibility of using the light-exit window also as light-entrance window for the reflected measuring light, and of feeding it to the light sensor, for example via a fibre coupler or a beam splitter. In this way, the measuring device can be arranged in the machining head in particularly compact and space-saving manner.

This holds, in particular, when the reflecting surface is part of a housing of the machining head, because then merely a light-exit window has to be positioned at a suitable position within the machining head.

The proportion of the measuring light reflected back again into the light-exit window is particularly high if the reflecting surface is plane and has been oriented to be perpendicular to the optical axis of the measuring light. In the ideal case, the measuring light then gets completely (disregarding unavoidable transmission losses and reflection losses) back again onto the light-exit window. If, on the other hand, the reflecting surface is curved, the axis of symmetry thereof should lie on the optical axis of the measuring light. In this case, an axis that, proceeding from a point in the middle of the light-exit window, extends to an image point thereof on the reflecting surface is regarded as the optical axis.

If the optical axis of the measuring light passes through the focusing optics or the part thereof at an angle different from zero inclined with respect to the optical axis thereof, the arrangement of beam-splitter elements in the beam path of the laser radiation can be dispensed with.

It is preferred if the measuring light passes through all the optical surfaces of the focusing optics, since only then can the change in the focal length of the focusing optics be registered completely. If the measuring light passes through only a part of the focusing optics, the measuring device should generate a further beam of measuring light, with which the remaining part of the focusing optics is gauged.

The imaging of the light-exit window onto the reflecting surface makes it possible to determine changes in the focal length of the focusing optics by exploiting the chromatic longitudinal aberration of the focusing optics. For this purpose the light source should have been set up to generate measuring light with at least two different wavelengths, simultaneously or in succession. The evaluating device then ascertains the focal length of the focusing optics from the intensity of the measuring light registered by the light sensor while taking account of the chromatic longitudinal aberration of the focusing optics or of the part thereof.

In this case, chromatically confocal measuring devices or measuring devices related thereto in a wider sense, such as have been described in WO 2009/153067 A2, can be used for the measurement of the focal length. The chromatically confocal measuring device here measures the spacing, fixed as such, between the light-exit window and the reflecting surface. The thermally conditioned changes in the focal length of the focusing optics lead to apparent changes of spacing which can be assigned directly to the focal length of the focusing optics or of the part thereof passed through by the measuring light. By virtue of this change of function of the chromatically confocal measuring principle, an extremely efficient, space-saving and highly accurate measurement of the focal length of the focusing optics can be carried out.

If the light source is a broadband light source, the light sensor should register the measuring light in wavelength-dependent manner. For this purpose a dispersing optical element, for example an optical grating or a wedge prism, may have been connected upstream of the light sensor. Such a dispersing optical element can be dispensed with if recourse is had to a chromatically confocal measuring device such as has been described in the aforementioned WO 2009/153067 A2.

As an alternative to this, the measuring device may take the form of an autocollimator. In this case the focusing optics or a part thereof images a pattern of light generated by the light source onto the light sensor. The evaluating device has been set up to calculate the focal length of the focusing optics or of the part thereof from a property, for example the contrast, of the image of the pattern of light registered by the light sensor. This is because if the focal length changes, the image of the pattern of light on the light sensor also changes, so that from the change in this image the focal length can be inferred. Such a measurement can also be performed when the focusing optics are catoptric, i.e. have been constructed exclusively from mirrors.

In one embodiment of the invention the measuring device has been set up in such a way to direct a first measuring-light bundle and a second measuring-light bundle onto differing regions of an optical surface of the focusing optics, and to evaluate them independently of one another. Such a splitting of the measurement onto differing regions is expedient particularly when differing adjusting elements are also being driven in order to compensate individually the changes in the focal length caused by the respective regions.

In particular, the second measuring-light bundle can be directed onto a central region of the optical surface, which contains the optical axis of the focusing optics, and the first measuring-light bundle can be directed onto a marginal region of the optical surface surrounding the central region preferentially in annular manner. From the gauging of the marginal region, control signals can then be derived for a first adaptive mirror which deforms over its entire surface, whereas, from the gauging of the central region, control signals can be derived for a second adaptive mirror which deforms only within its central region.

In this connection the fact is taken into account that the laser radiation likewise impinges onto only a central region of the optical surface in question, so that the heating is greatest there. Since the heat discharges into the surrounding marginal region, however, a deformation also occurs there, even though this is weaker and appears in temporally delayed manner. The result is, in general, an aspherical deformation of the optical surface, which can be compensated by two different adaptive mirrors or other correction elements.

The radial dimension of the central region has preferentially been established in such a way that on the outer edge of the central region the intensity of the laser radiation has fallen to its $1/e^2$ portion, relative to the intensity in the centre of the laser radiation.

As already mentioned, the evaluating device may have been set up to establish a control signal for an adjusting element with which the optical action of an optical element can be changed in such a way that if the adjusting element is driven with the control signal the optical element at least partly compensates a change in the focal length of the focusing optics measured by the measuring device. In the case of the optical element it may be a question, in particular, of a lens that is contained in the focusing optics and that, for the purpose of changing the focal length, is traversed along the optical axis. However, a mirror with which the laser radiation is deflected and adjustably focused also enters into consideration. Such a mirror may also be located outside the actual machining head, in particular in a beam-feed device of the laser machining apparatus.

In general, the focusing optics include at least one protective disc that is transparent to the laser radiation and the measuring light. This disc has preferably been arranged both in the beam path of the measuring light and in the beam path of the laser radiation. As a result, the measuring light can also register a thermally induced deformation of the protective disc. This is of significance for the reason that such a deformation can likewise have an effect on the position of the focal spot.

In this case it is favourable if a memory has been assigned to the evaluating device, in which changes in the focal length at several points in time after the machining head has been put into operation have been stored. The evaluating device has then been set up to infer, by comparing stored changes, a degree of contamination and/or a destruction of the protective disc. This concept is based on the consideration that the focal length of the focusing optics changes always in the same way after the laser machining apparatus has been put into operation, provided the focusing optics have been exposed to the laser radiation over the same period of time and with the same intensity. If, despite such constant conditions, significant deviations occur in the shortening of the focal length of the focusing optics, this allows it to be inferred that the contamination of the protective disc has increased since the last measurement. For by virtue of an increased contamination of the protective disc the latter absorbs more laser radiation, and as a result deforms more severely. If such a more severe contamination of the protective disc is registered, the laser machining should be discontinued as promptly as possible and the protective disc should be exchanged for a new protective disc. Otherwise there is a danger that the protective disc will break as a result of excessive heating, by virtue of which the costly parts of the focusing optics may be contaminated.

If the increase in the contamination could not be detected in good time, the evaluating device also registers a destruction of the protective disc extremely quickly. Since the destruction has, in general, been preceded by a prior heating and hence a shortening of the focal length of the focusing optics, a destruction of the protective disc becomes noticeable through an abrupt lengthening of the focal length, because the refractive power of the heated protective disc is then suddenly cancelled.

In the beam path of the measuring light at least one optical element may have been arranged that has not been exposed to any laser radiation but contributes to the imaging of the light-exit window onto the reflecting surface. Such an optical element is expedient, in particular, when the measuring light passes through only a part of the focusing optics. Since the focal length of said part may be relatively long, the reflecting surface would have to have been arranged correspondingly far from the light-exit window.

In addition, with an additional optical element with collecting action the divergence of the measuring light emerging from the light-exit window can be diminished in such a way that the focusing optics or said part thereof are/is passed through by the measuring light only in the particularly important central regions which have also been exposed to the laser radiation.

The invention provides, in addition, a laser machining apparatus with a laser radiation source with a machining head according to the invention and elucidated above, the measuring device having been set up to direct two measuring-light bundles onto differing regions of an optical surface of the focusing optics, and to evaluate them independently of one another, and with a beam-feeding device which has been arranged in the optical path between the laser radiation source and the machining head and which feeds laser radiation generated by the laser radiation source to the machining head. The evaluating device has, in accordance with the invention, been set up to establish, on the basis of measured values that were obtained exclusively by using the first measuring-light bundle, a control signal for a first adjusting element, with which the optical action of a first optical element can be changed, in such a way that if the first adjusting element is driven with the control signal the first optical element at least partly compensates a change, measured by the measuring device, in the focal length of the focusing optics, and that the evaluating device has furthermore been set up to establish, on the basis of measured values that were obtained exclusively by using the second measuring-light bundle, a control signal for a second adjusting element which is different from the first adjusting element and with which the optical action of a second optical element, preferentially different from the first optical element, can be changed, in such a way that if the second adjusting element is driven with the control signal the second optical element at least partly compensates a change, measured by the measuring device, in the focal length of the focusing optics. The first optical element and the second optical element have in this connection been arranged in the beam path of the laser radiation between the laser radiation source and the focal spot, in particular in the beam-feeding device.

The first optical element may in this case be a first adaptive mirror, and the second optical element may be a second adaptive mirror. With the first adjusting element a deformation is then achieved exclusively of a part of an adaptive mirror onto which a first portion of the total intensity of the laser radiation impinges. With the second adjusting element a deformation is achieved of a part of the second adaptive mirror onto which a second portion of the total intensity of the laser radiation impinges, which is smaller than the first portion. In other words, on the adaptive mirrors variably large regions are deformed which correspond to the central region, on the one hand, and to the combination of central region and annular region, on the other hand. The first adaptive mirror then undertakes, to a certain extent, the base load of the correction, while the second adaptive mirror additionally generates an aspherical action.

The second adaptive mirror may include a mirror substrate and a reflecting coating borne thereby, the mirror substrate bounding a pressure chamber and deforming together with the reflecting coating borne thereby, depending on the internal pressure in the pressure chamber. It is particularly favourable in this connection if the mirror substrate has a thickness which varies at least within a region of the mirror substrate that has been covered by the coating and bounds the pressure chamber. In this way, the deformation of the mirror substrate, which arises as a consequence of a change in the internal pressure, can be set by establishing the thickness profile. Given suitable establishment of the thickness profile, it is even possible only with a single adaptive mirror to achieve a complete compensation of the undesirable thermally induced changes in the optical properties of the focusing optics.

In particular, the mirror substrate in said region may have a rotationally symmetrical thickness profile which has been established in such a manner that the mirror substrate deforms aspherically in the event of a change in the internal pressure.

The first adaptive mirror may have a mirror substrate with a thickness which is constant within a region of the mirror substrate that has been covered by the coating and bounds the pressure chamber.

The invention provides, in addition, a process for measuring changes in the focal length of focusing optics which are contained in a machining head of a laser machining apparatus which has been set up for the machining of workpieces with laser radiation, whereby the focusing optics focus laser radiation fed to the machining head in a focal spot. In accordance with the invention, the process exhibits the following steps:
  a) generating measuring light that is different from the laser radiation;
  b) imaging a light-exit window, from which measuring light emerges, at least with the assistance of the focusing optics or of a part thereof, onto a reflecting surface that has been arranged to be stationary relative to the light-exit window and to the focusing optics and is not part of the focusing optics;
  c) registering measuring light that has emerged from the light-exit window, has passed through the focusing optics or the part thereof, was reflected on the reflecting surface, and has again passed through the focusing optics or the part thereof, with a light sensor, whereby the measuring light impinges at least partly onto regions of optical surfaces of the focusing optics onto which the laser radiation also impinges;
  d) ascertaining the change in the focal length from measuring signals made available by the light sensor.

The advantages and configurations elucidated above with respect to the machining head and the laser machining apparatus apply correspondingly to the process.

The invention provides, in addition, a process for registering the degree of contamination or the integrity of a protective disc which is part of focusing optics which are contained in a machining head of a laser machining apparatus, with the following steps:

a) measuring a focal length of the focusing optics at a first point in time;
b) measuring the focal length of the focusing optics at a second point in time;
c) determining the degree of contamination or the integrity of the protective disc by comparing the focal length measured in steps a) and b).

In step c), results of measurement of the focal length of the focusing optics can additionally be taken into account that were carried out at points in time at which the operating conditions were at least substantially the same as at the points in time at which the measurements in steps a) and b) were carried out. As a result, conclusions can be drawn as to the degree of contamination.

BRIEF DESCRIPTION OF THE DRAWINGS

Further features and advantages of the invention will become apparent from the following description of the embodiments with reference to the drawings. Shown therein are.

DESCRIPTION OF PREFERRED EMBODIMENTS

Figure 1:
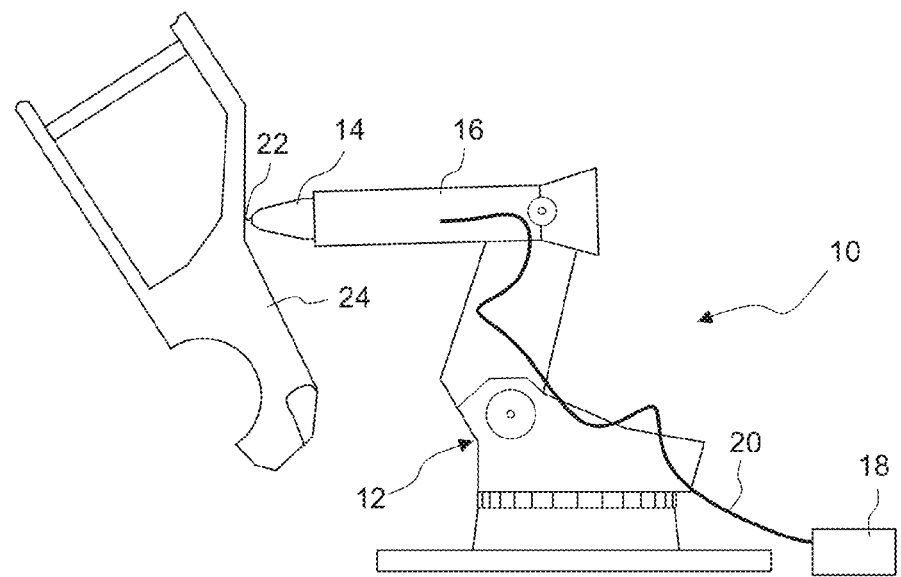
FIG. 1 a schematic side view of a laser machining apparatus according to the invention.

FIG. 1 shows, in a side view, a laser machining apparatus 10 with a robot 12 and with a machining head 14 according to the invention, which has been fastened to a mobile arm 16 of the robot 12.

The laser machining apparatus 10 includes, in addition, a laser radiation source 18, which in the embodiment that is represented takes the form of a Nd:YAG laser, disk laser or fibre laser. The laser radiation generated by the laser radiation source 18 is fed via an optical fibre 20 to the machining head 14 and is focused by the latter in a focal spot 22. The arm 16 of the robot 12 is positioned in relation to a workpiece 24 in such a way that the focal spot 22 is located at the desired location on the workpiece 24 and the latter can be machined by welding, severing, or in another way.

Of course, other lasers also enter into consideration by way of laser radiation source 18, for example $CO_2$ lasers, the radiation of which, however, is generally fed to the machining head 14 not via optical fibres but with the aid of mirrors.

Figure 2:
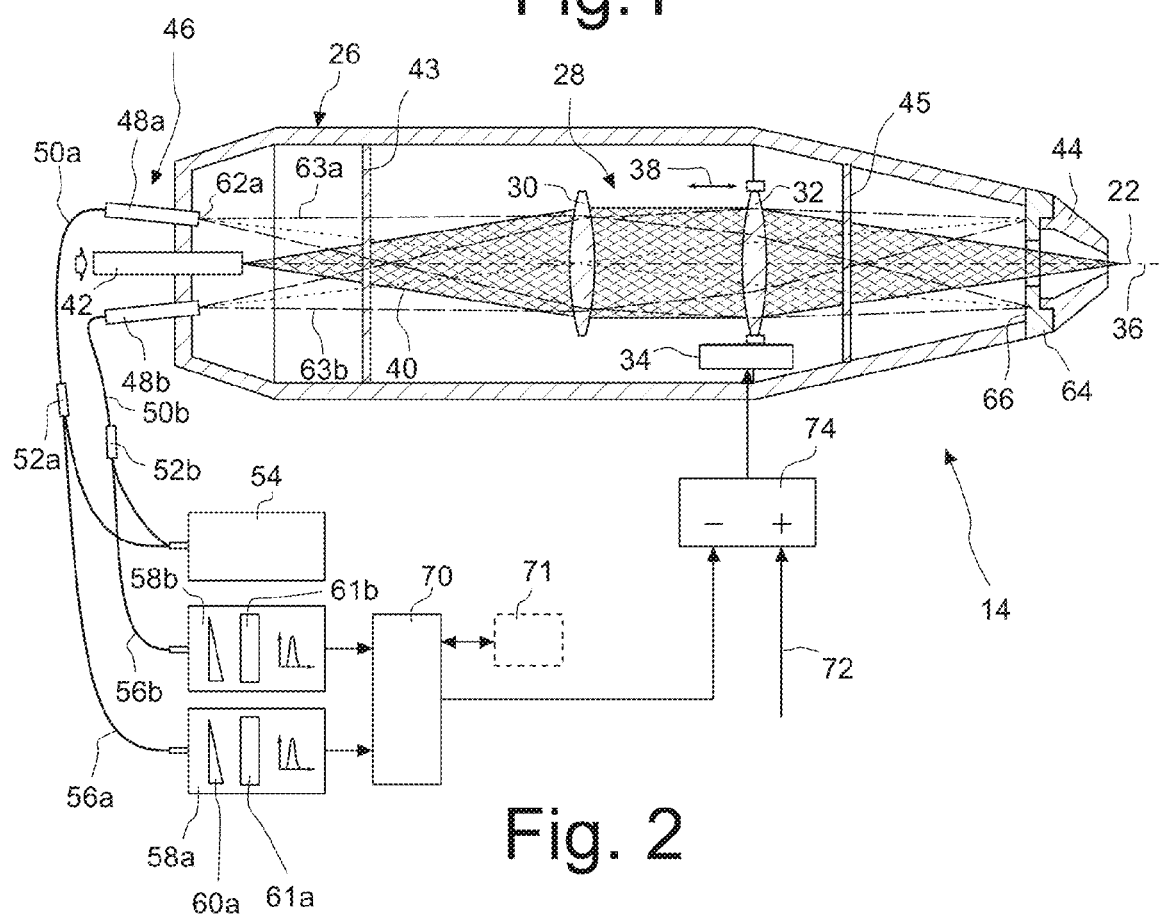
FIG. 2 a meridional section through a machining head of the laser machining apparatus shown in FIG. 1.

FIG. 2 shows the machining head 14 according to the invention schematically in a meridional section. In a housing 26 of the machining head 14 focusing optics 28 have been arranged which in the embodiment that is represented comprise a first lens 30 and a second lens 32. The first lens 30 has been arranged, in the embodiment that is represented, to be fixed with respect to the housing, in a manner not represented in any detail. The second lens 32 is traversable along an optical axis 36 of the focusing optics 28 with the aid of an adjusting drive 34, as has been indicated in FIG. 2 by a double-headed arrow 38. The focusing optics 28 serve to focus laser radiation 40, which emerges from a laser-radiation fibre plug 42, at the focal spot 22. The axial position of the focal spot 22 may in this case be changed by traversing of the second lens 32. The focal spot 22 in this case always lies outside an interchangeable tip 44 of the housing 26.

The two lenses 30, 32 have been manufactured from a material that is highly transparent to the laser radiation 40. Nevertheless, a portion (albeit small) of the laser radiation 40 is absorbed by the lenses 30, 32, as a result of which the latter heat up. The heating leads, on the one hand, to a change in the refractive index of the lens material and, on the other hand, to a thermal expansion of the lenses 30, 32. Since, in general, the refractive index increases with the temperature (dn/dT>0), and the lenses 30, 32 are converging lenses, in the event of a heating an increase in the refractive power occurs. In the case of lens materials with dn/dT<0, or in the case of focusing optics that combine materials having dn/dT>0 and dn/dT<0, the invention can likewise be employed. By virtue of the real-time measurement, in the last-mentioned case the fact is also taken into account that the thermal conductivity and hence the temporal progression of the thermally conditioned deformation of the materials with dn/dT<0 differ greatly from the values of the materials with dn/dT>0.

If, after commencement of machining operation, the lenses 30, 32 firstly still have the ambient temperature and are then rapidly (typically, within seconds up to a few minutes) heated by the laser radiation 40, for this reason the focal spot 22 is displaced towards the machining head 14. The focal spot 22 may in this case travel a distance of several millimeters. After some time a steady temperature distribution arises in the lenses 30, 32, so that the focal spot 22 remains approximately stationary. But any interruption of the laser machining leads at once again to a different temperature distribution in the lenses 30, 32, and for this reason has an effect on the axial position of the focal spot 22.

In addition to the axial displacement of the focal spot 22, the shape and lateral expansion thereof may also change if the lenses 30, 32 heat up. This is caused by temperature-induced imaging errors which are brought about by the lenses 30, 32. Above all when the heating of the lenses 30, 32 by the laser radiation 40 is uneven, the refracting surfaces of the lenses 30, 32 lose their mostly spherical shape, resulting, as a rule, in imaging errors.

The focusing optics 28 include, in addition, two plane-parallel protective discs 43, 45 which, in a manner not represented in any detail, have been arranged in the beam path of the laser radiation 40 in such a way that they can be exchanged without disassembly of the machining head 10. The protective discs 43, 45 are also partly heated by the laser radiation 40, with the consequence that they act on the laser radiation 40 like converging lenses. Consequently the protective discs 43, 45 also contribute to a thermally induced displacement of the focal spot 22.

This effect is particularly great if the protective discs 43, 45 have been contaminated, because the absorption of the laser radiation 40 then increases considerably. A more severe contamination may in this case lead, in an extremely short time, to the thermal destruction of the protective discs 43, 45. Particularly susceptible to a contamination in this case is the protective disc 45 situated closer to the focal spot, since it has been exposed to splashes of material or smoke arising at the machining point.

In order to be able to detect a displacement of the focal spot 22 and/or changes in its lateral dimensions in good time, in the machining head 14 a measuring device denoted overall by 46 has been integrated, whereby individual parts of the measuring device may also be located outside the housing 26 but have been functionally assigned to the machining head 14. The measuring device 46 includes a first measuring-light fibre plug 48a, the axis of which has been arranged at an angle with respect to the optical axis 36 of the focusing optics 28, i.e. not parallel. The first measuring-light fibre plug 48a has been connected to a measuring-light source 54 via a first optical waveguide 50a and a first fibre coupler 52a. By the first fibre coupler 52a the first measuring-light fibre plug 48a has been connected via a further optical waveguide 56a to a spectrograph 58a. The latter contains a dispersing optical element, for example a prism 60a or a grating, and a light sensor 61a that is position-resolving in one direction.

In the case of the measuring-light source 54 it is a question of a broadband light source which generates polychromatic light. This measuring light reaches, via the first optical waveguide 50a, the first measuring-light fibre plug 48a and emerges there at an exit window 62a of the first measuring-light fibre plug 48a. The measuring light, which has been indicated in FIG. 2 by 63a, then propagates divergently along the direction predetermined by the axis of the measuring-light fibre plug 48a and in the process penetrates the two lenses 30, 32. On an annular internal surface, designated in the following as reflecting surface 66, of an assembly ring 64 pertaining to the housing 26 the measuring light 63a is reflected and again passes through the lenses 30, 32, but now in reverse sequence. The position of the exit window 62a in the housing 26 has been established in this case in such a way that it is located at an optically conjugate position relative to the reflecting surface 66. The exit window 62a is consequently imaged by the lenses 30, 32 onto the reflecting surface 66, and conversely.

For this reason the measuring light 63a emerging from the exit window 62a enters again, in part, the exit window 62a of the measuring device 46. Via the first fibre coupler 52a at least this reflected portion of the measuring light 63a reaches the first spectrograph 58a which registers the intensity of the reflected measuring light in wavelength-dependent manner. The first spectrograph 58a in this case is insensitive to laser radiation 40 that as a consequence of multiple reflections on optical surfaces has got into the beam path of the measuring light 63a.

The two lenses 30, 32 generate, by reason of the dispersion of material, a chromatic longitudinal aberration. The focal length of the focusing optics 28 depends for this reason on the wavelength of the measuring light. Since the measuring light is polychromatic, on the reflecting surface 66 an individual focal spot, to which all the wavelengths contribute, consequently does not arise. Merely the light of a single wavelength is focused precisely onto the reflecting surface 66, and for this reason for the most part gets back again to the exit window 62a.

Figure 3:
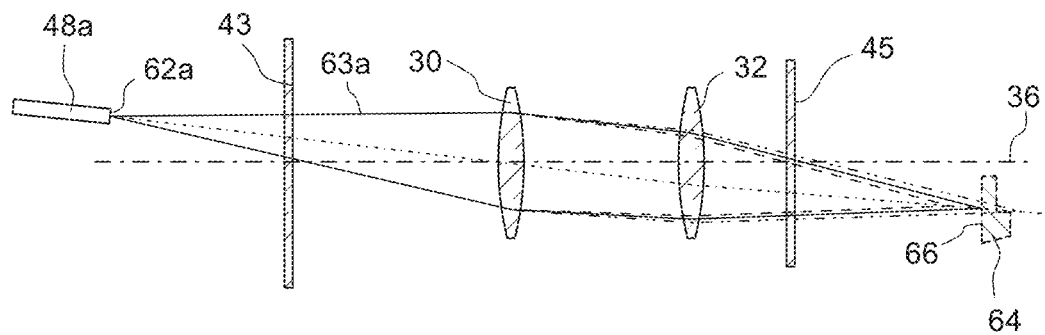
FIG. 3 a detail from the machining head shown in FIG. 2 in the cold state.

This has been illustrated in FIG. 3, which shows a detail from FIG. 2. Represented are merely the two lenses 30, 32, the protective discs 43, 45, the first measuring-light fibre plug 48a with the exit window 62a, and also a part of the assembly ring 64 with the reflecting surface 66. Light of varying wavelength has been represented in FIG. 3 by differing broken lines. If the image of the exit window 62a, which is generated by light of one wavelength, does not lie exactly on the reflecting surface 66, only relatively little light gets back into the exit window 62a. Merely the light, indicated by a continuous line, of a single wavelength is, for the most part, reflected back into the exit window 62a of the first measuring-light fibre plug 48a. If the reflecting surface 66 has been oriented to be perpendicular to the axis of the measuring-light fibre plug 48a, the proportion of the measuring light reflected back into the exit window 62a increases, having a favourable effect on the measuring accuracy.

Figure 4:
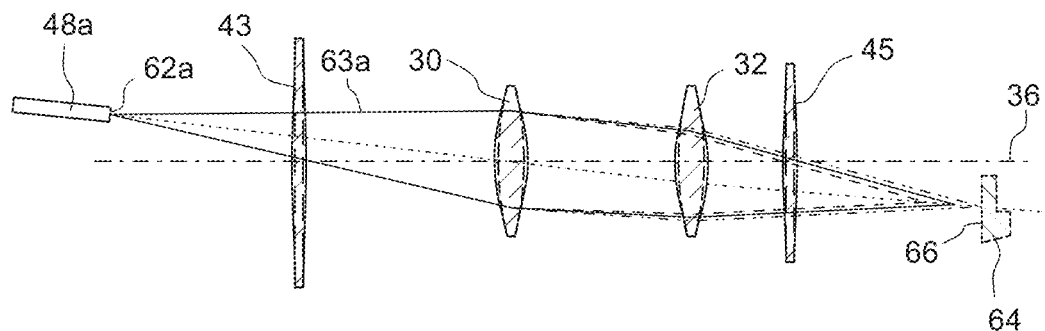
FIG. 4 the detail shown in FIG. 3 in the heated state.

The structure of the measuring device 46 consequently corresponds, in principle, to that of a confocal chromatic spacing-measuring device such as is known, for example, from a paper by C. Dietz and M. Jurca entitled *Eine Alternative zum Laser*, Sensormagazin No. 4, 3 Nov. 1997, pages 15 to 18. The wavelength at which a maximum is registered in the first spectrograph 58a has been assigned in an evaluating device 70 of the measuring device 46 to a certain spacing between the exit window 62a and the reflecting surface 66 via the resulting focal length of the focusing optics 28. If the lenses 30, 32 and the protective discs 43, 45 are heated and expand as a result, as has been indicated in FIG. 4, the focal length shortens not only for the focal spot 22 generated by the laser radiation 40 but also for the measuring light 63a, as can be discerned in FIG. 4. As a consequence of this shortening of the focal length, the image of the exit window 62a, which is generated by another wavelength and in the 'cold' state of the focusing optics 28 was still situated outside the reflecting surface 66, now lies on the reflecting surface 66, as a comparison with FIG. 3 shows.

For this reason the first spectrograph 58a registers a maximal retroreflection intensity at a different wavelength from that previously. For this reason, wavelengths for which a maximum is registered have been assigned in the evaluating device 70 to a refractive power of the focusing optics 28. If this refractive power changes as a consequence of a heating of the lenses 30, 32 and of the protective discs 43, 45, this can be detected at once from a shift of the maximum in the spectrum of the measuring light 63a received by the first spectrograph 58a.

The evaluating device 70 compares the focal length corresponding to a certain refractive power of the focusing optics 28 with a set value 72 which is supplied to a control unit 74 for the adjusting drive 34 (cf. FIG. 2). If the measuring device 46 establishes that the focal length of the focusing optics 28 has shortened as a consequence of its heating, the adjusting drive 34 is driven in such a way that the second lens 32 is traversed along the optical axis 36 in the direction of the tip 44, as a result of which the temperature-induced shortening of the focal length is compensated. In the case of the measuring device 46 shown in FIG. 2, in which the measuring light 63a passes through all the optical elements of the focusing optics.

In the embodiment that is represented, the measuring device 46 further includes a second measuring-light fibre plug 48b, a second optical waveguide 50b, a second fibre coupler 52b, a second optical waveguide 56b and also a second spectrograph 58b, which has likewise been connected to the evaluating device 70. The second measuring-light fibre plug 48b has been arranged in the same meridional plane as the first measuring-light fibre plug 48a, but symmetrically opposite the latter. The arrangement of the two fibre plugs 48a, 48b may in this case have been chosen in such a way that the respectively emerging measuring light penetrates differing regions of the lenses 30, 32. As a result, items of information are obtained, independently of one another, about changes in refractive power in differing regions of the lenses 30, 32 and of the protective discs 43, 45. As will be elucidated further below with reference to FIG. 13, these items of information obtained independently of one another can be processed further separately, in order thereby to deform differing regions of one or more adaptive mirrors or other optical compensating elements. Each region on the compensating element(s) then corresponds to a region on the lenses 30, 32.

In the embodiment that is represented, the measuring-light source 54 supplies both subsystems jointly with measuring light. Of course, each subsystem may also have its own source of measuring light.

2. Alternative Embodiments

In the following, alternative embodiments will be elucidated with reference to FIGS. 5 to 13.

a) Differing Measuring Regions

Figure 5:
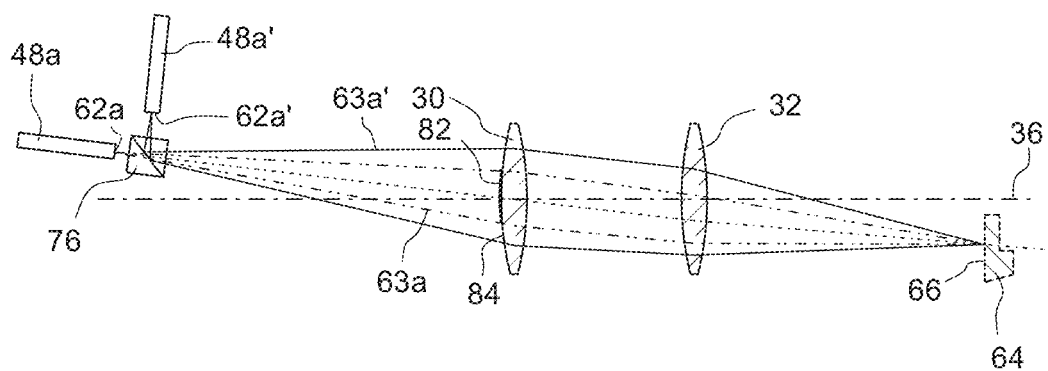
FIG. 5 a detail, corresponding to FIG. 3, through a machining head according to another embodiment, wherein differing regions of the lenses are gauged separately from one another.

In the embodiment shown in FIG. 5 the first subsystem comprises, for its part, two separate measuring systems with which differing regions on the lenses 30, 32 can be gauged. In addition to the first measuring-light fibre plug 48a, a second fibre plug 48a' has been provided, from which the measuring light 63a' likewise emerges which is coupled into the beam path of the measuring light via a beam-splitter cube 76.

Figure 6:
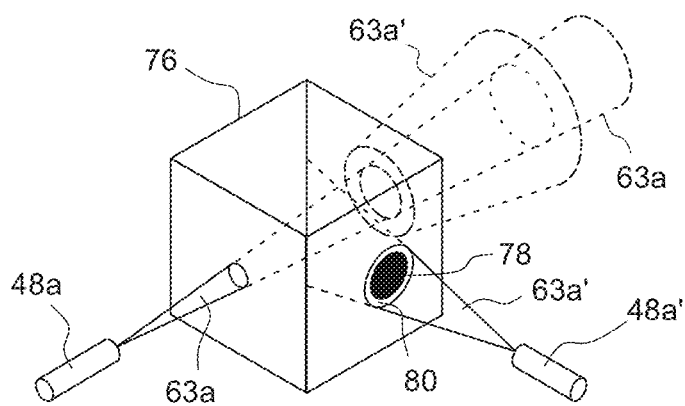
FIG. 6 an enlarged detail from a beam-splitter cube of the measuring device shown in FIG. 5.

FIG. 6 shows the beam-splitter cube 76 with the measuring-light fibre plugs 48a, 48a' in an enlarged perspective arrangement. It will be discerned that the measuring light 63a emerging from the first measuring-light fibre plug 48a has a smaller numerical aperture than the measuring light 63a' which emerges from the second measuring-light fibre plug 48a'. On one side surface of the beam-splitter cube 76 a light-absorbing diaphragm 78 has been applied which has a circular shape. The diaphragm 78 in this case covers an inner region of the surface which on this side of the beam-splitter cube 76 is illuminated with the measuring light 63a'. Consequently, on this side of the beam-splitter cube 76 the measuring light 63a' penetrates only an annular region 80.

The numerical aperture of the measuring light 63a emerging from the measuring-light fibre plug 48a has been established in such a way that in the first and second measuring light 63a, 63a' emerging from the beam-splitter cube 76, which in FIG. 6 has been indicated in dashed manner, the measuring light 63a illuminates an inner region, and the measuring light 63a' illuminates a region that surrounds the inner region in annular manner. As can be discerned in FIG. 5, the measuring light 63a and the measuring light 63a' then penetrate differing regions on the lenses 30, 32, namely a central region 82 and, respectively, an annular region 84 surrounding the central region in annular manner.

Spectrographs that spectrally evaluate the light reflected into the measuring-light fibre plugs 48a, 48a' consequently register changes in refractive power of the lenses 30, 32 individually for the regions 82, 84 which are respectively passed through by the measuring light 63a and 63a'.

Of course, the other subsystem of the measuring device 46 shown in FIG. 2 may also include two measuring-light fibre plugs 48b, 48b', in order, there too, to be able to gauge differing regions on the lenses 30, 32 individually.

b) Autocollimator

Figure 7:
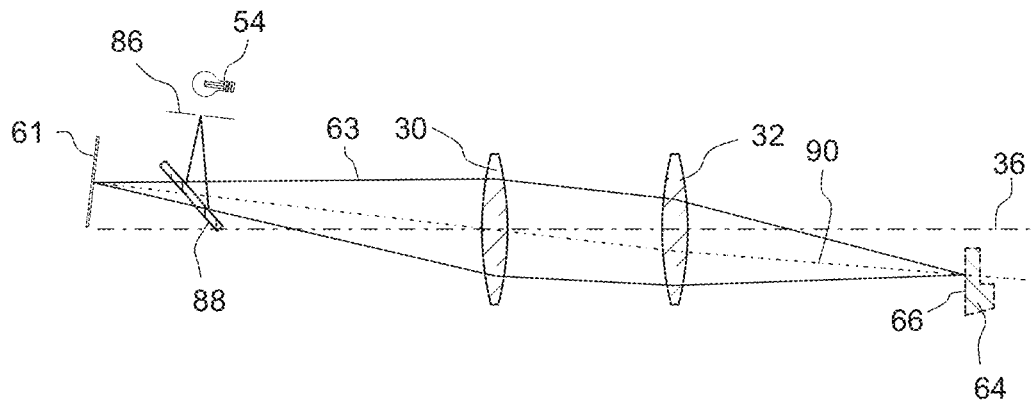
FIG. 7 a detail, corresponding to FIG. 3, through a machining head according to another embodiment, wherein the measuring device takes the form of an autocollimator.

In the embodiment shown in FIG. 7 the measuring device 46 takes the form of an autocollimator. A measuring-light source 54 generates here, by illuminating a diaphragm 86 with two crossed slits, a cruciform pattern of light which via an incoupling mirror 88 is imaged onto the reflecting surface 66. By virtue of reflection on the reflecting surface 66, the image 89, shown in FIG. 9, of the diaphragm 86 arises on a position-resolving image sensor 61 which, for example, may take the form of a CCD sensor. The location of the image on the image sensor 61 depends in this case on the angle between the reflecting surface 66 and the axis 90 of the measuring light 63. Also in this embodiment, the measuring light consequently passes through the two lenses 30, 32 twice before it is registered by the light sensor 61.

Figure 8:
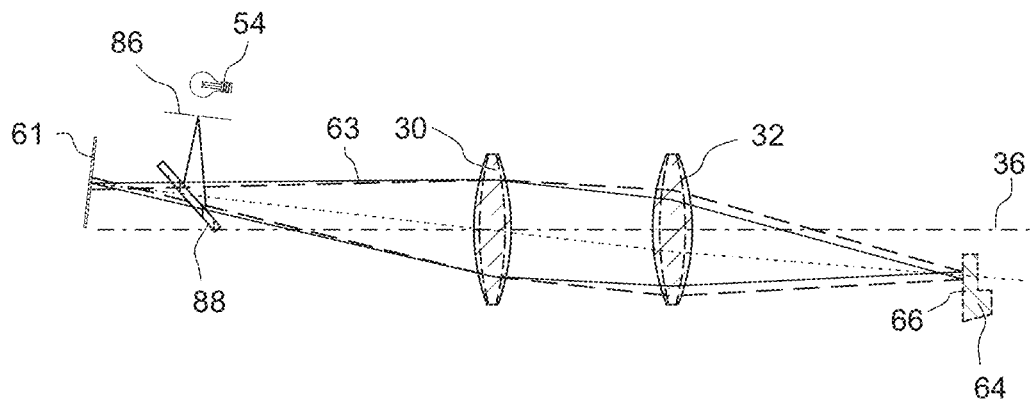
FIG. 8 the measuring device shown in FIG. 7 after heating of the lenses.
Figure 9:
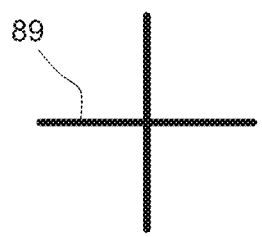
FIGS. 9 and 10 the image of a pattern of light on an image sensor of the autocollimator shown in FIG. 7 in the cold state and in the heated state, respectively.
Figure 10:
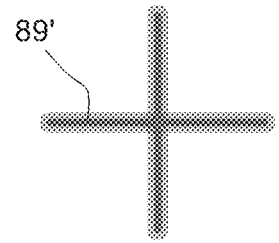

If the lenses 30, 32 (and the protective discs which are not represented) expand as a consequence of heating, as FIG. 8 illustrates, the focal length of the focusing optics 28 changes. The image 89' of the diaphragm 86 on the image sensor 61 becomes unsharp as a result, as FIG. 10 illustrates. With the aid of a contrast measurement of the image 89', it is possible to register quantitatively how the refracting action of the lenses 30, 32 changes as a consequence of the heating.

c) Separate Gauging

Figure 11:
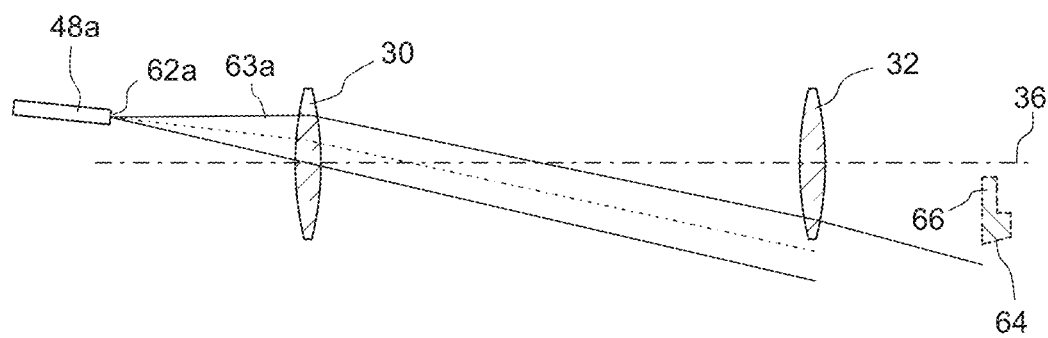
FIG. 11 a detail, corresponding to FIG. 3, through a machining head according to another embodiment, wherein the lenses in the machining head are far away from one another.

Particularly if the lenses 30, 32 have been spaced a long way from one another, the case illustrated in FIG. 11 may arise, namely that for reasons of construction space the measuring light 63a emerging from the exit window 62a cannot pass through both lenses 30, 32 in such a way that it is reflected again from the reflecting surface 66 back into the exit window 62a.

Figure 12:
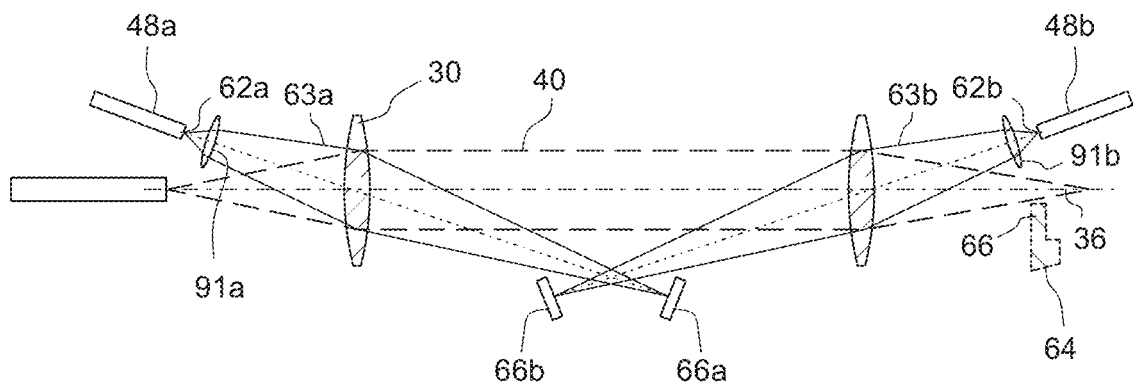
FIG. 12 a representation corresponding to FIG. 11, wherein each lens is gauged by its own measuring device.

In this case the arrangement shown in FIG. 12 may find application, in which to each of the two lenses 30, 32 a specific measuring-light fibre plug 48a and 48b, respectively, and a specific reflecting surface 66a and 66b, respectively, have been assigned. The reflecting surfaces 66a, 66b are formed in this embodiment by additional mirrors which have been arranged to be fixed with respect to the housing. The mirrors are plane and have been oriented to be perpendicular to an optical axis, indicated in dashed manner in FIG. 11, of the respective measuring light 63a or 63b.

In order to diminish the divergence of the measuring light 63a, 63b emerging from the measuring-light fibre plug 48a, 48b, in the beam path of the measuring light there is located a converging lens 91a and 91b, respectively. The converging lenses 91a, 91b have not been exposed to the laser radiation 40 but contribute to the imaging of the light-exit windows 62a, 62b onto the reflecting surfaces 66a, 66b.

d) Determination of the Degree of Contamination

To the evaluating device 70 of the embodiment shown in FIG. 2 a memory 71 indicated in dashed manner may have been assigned, in which, each time the device is put into operation, the changes in the focal length of the focusing optics 28 (or values that are linked to the focal length) are stored at several points in time. The evaluating device 70 can then compare the values for the focal length obtained during an actual measurement with the stored values and can deduce therefrom whether the degree of contamination of the protective discs 43, 45 has increased, or the latter have even been destroyed. An increase in the degree of contamination becomes noticeable through a distinctly faster shortening of the focal length under otherwise identical operating conditions. A destruction, on the other hand, may be detected from an abrupt increase in the focal length, because then the focusing action of the protective discs 43, 45 occurring in the event of thermal loading suddenly decreases.

e) Compensation of the Focal-Spot Displacement

In order to compensate displacements of the focal spot 22, there is also the possibility of relocating optical elements outside the machining head 14 in such a way that the position and size of the focal spot 22 remain constant also in the event of a heating of the lenses 30, 32.

Figure 13:
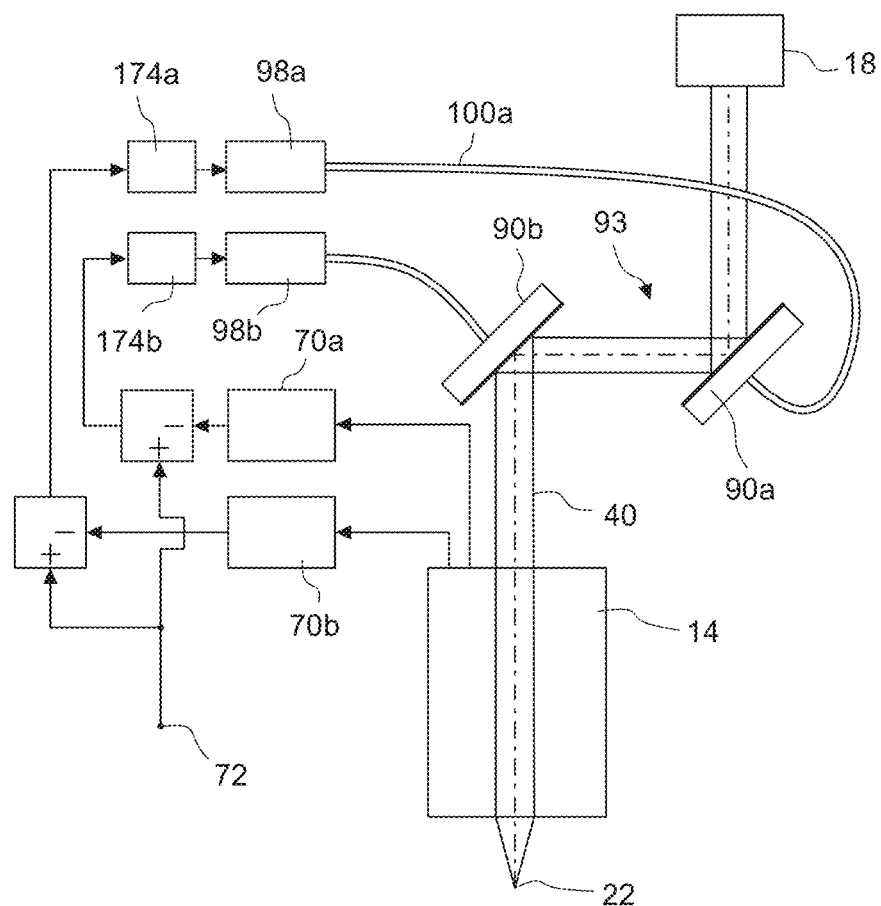
FIG. 13 a diagrammatic sketch for elucidating how, on the basis of the measured changes in the focal length of the lenses in the machining head, adaptive mirrors in a beam-feeding device are driven.

FIG. 13 shows a set-up in which the laser radiation 40 is fed in free space to the machining head 14 as a collimated beam via a beam-feeding device 93 which includes two adaptive deflecting mirrors 90*a*, 90*b* shown in FIGS. 14 and 15 in a meridional section.

Figures 14A, 14B:
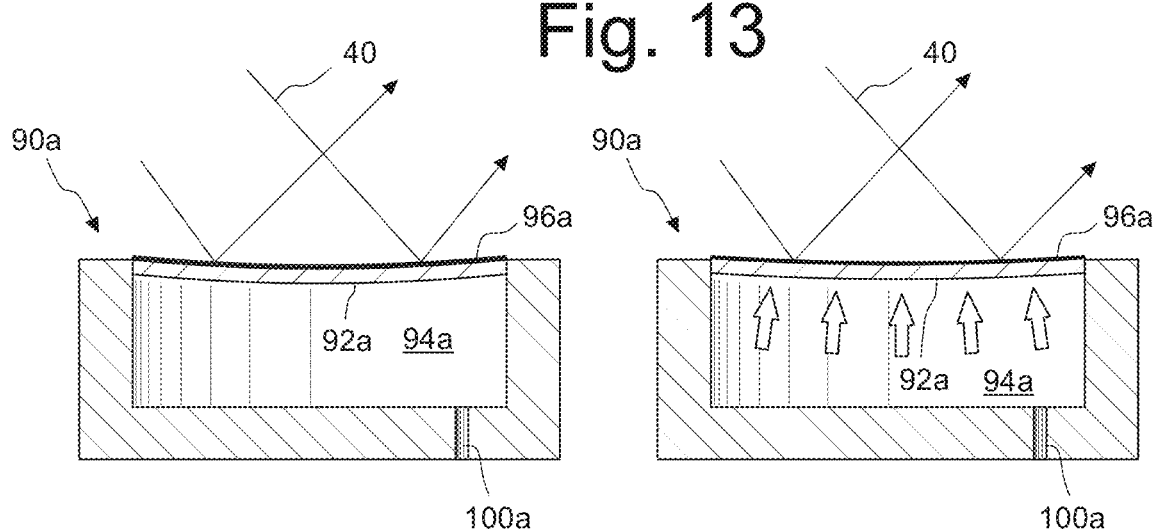
FIGS. 14a and 14b an adaptive mirror with constant thickness profile in a meridional section before and after, respectively, an increase in pressure.
Figure 15A:
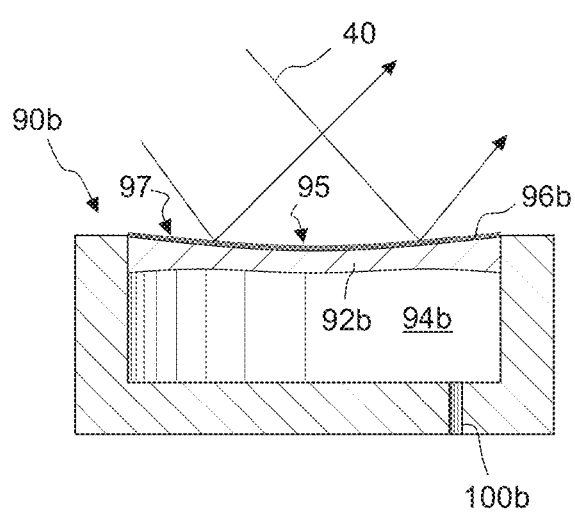
FIGS. 15a and 15b an adaptive mirror with varying thickness profile in a meridional section before and after, respectively, an increase in pressure.
Figure 15B:
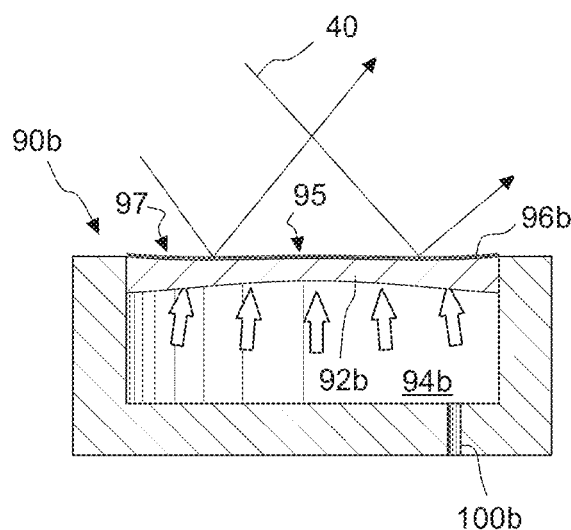

FIG. 14*a* shows the first adaptive mirror 90*a* in a meridional section. The first adaptive mirror 90*a* includes a mirror substrate 92*a* which adjoins a pressure chamber 94*a* and, for example, may consist of glass or copper. The mirror substrate 92*a* bears a reflecting coating 96*a* which, as a rule, comprises a plurality of thin individual layers. The pressure chamber 94*a* of the first adaptive mirror 90*a* has been connected to a pressure source 98*a* (see FIG. 13) via a pressure line 100*a*. If the internal pressure in the pressure chamber 94*a* is changed with the aid of the pressure source 98*a*, the mirror substrate 92*a* with the reflecting coating 96*a* borne thereby deforms. Of course, the changes in the radii of curvature of the adaptive mirrors 90*a* and 90*b* can likewise also be registered with the measuring process according to the invention. However, since the mirrors cause no chromatic error, the path of the measuring beam has to contain additional optical components that exhibit a chromatic error (without imaging).

As shown in FIG. 14*a*, the first adaptive mirror 90*a* in the embodiment that is represented has a concave shape if an initial pressure, for example normal pressure, prevails in the pressure chamber 94*a*. If the internal pressure in the pressure chamber 94*a* is increased with the aid of the pressure source 98*a*, the mirror substrate 92*a* with the reflecting coating 96*a* borne thereby deforms, as the arrows in FIG. 14*b* indicate. By virtue of the deformation, the curvature of the mirror substrate 92*a* is diminished, and consequently also the concentrating action of the adaptive first mirror 90*a*. This diminished concentrating action is used for the purpose of compensating the thermally induced shortening of the focal length of the following focusing optics 28.

The second adaptive mirror 90*b* has, in principle, been constructed exactly like the first adaptive mirror 90*a*. In contrast to the first adaptive mirror 90*a*, however, the mirror substrate 92*b* of the second adaptive mirror 90*b* has a thickness which varies at least within a region of the mirror substrate 92*b* that has been covered by the coating 96*b* and bounds the pressure chamber 94*b*. In the embodiment that is represented, the thickness profile of the mirror substrate 92*b* is rotationally symmetrical and has been chosen in such a way that the thickness increases continuously, or in steps, proceeding from a central region 95 containing the optical axis (centre of the mirror) towards a marginal region 97 surrounding the central region. The profile has furthermore been established in such a way that the mirror substrate deforms aspherically in the event of an increase in the internal pressure, as can be discerned in the case of a comparison of FIGS. 15*a* and 15*b*.

The pressure sources 98*a* and 98*b* assigned to the adaptive mirrors 90*a*, 90*b* are controlled by control units 174*a* and 174*b*, respectively, which assume the role of the control unit 74 of the embodiment shown in FIG. 2. If the evaluating devices 70*a*, 70*b* of the measuring device establish a displacement or some other change in the focal spot 22 in the manner described above, the control units 174*a*, 174*b* calculate, by comparison with the corresponding set values 72, a requisite deformation of the reflecting surfaces of the adaptive mirrors 90*a*, 90*b*. The control units 174*a*, 174*b* drive the pressure sources 98*a*, 98*b* for this purpose in such a way that the latter generate changes of pressure in the pressure chambers 94*a* and 94*b*, respectively, that result in the desired deformations of the mirror substrates 92*a*, 92*b*.

Preferentially the profiles of the mirror substrates 92*a*, 92*b* have been specially adapted to the regions in which the measuring light 63*a*, 63*a*' passes through the focusing optics 28. If it is assumed that the measuring light 63*a* emerging from the first measuring-light fibre plug 48*a* penetrates central regions 82 of the focusing optics 28, such as have been shown in FIG. 5, and the measuring light 63*a*' emerging from the second measuring-light fibre plug 48*a*' penetrates annular regions 84 of the focusing optics 28 surrounding the central regions 82 in annular manner, then by virtue of the set-up shown in FIG. 13 the measurement of the annular regions 84, which have not been exposed to the laser radiation 40, is assigned to the first adaptive mirror 90*a*.

The annular regions 84 undergo a thermal deformation, because the heat that is generated in the central regions by partial absorption of the laser radiation 40 discharges, in part, into the annular regions 84. As a result, a type of base load of the deformation occurs which is compensated by the first adaptive mirror 90*a*, for the latter deforms uniformly over and beyond the entire substrate surface 92*a* abutting the pressure chamber 94*a*. In this way, measuring signals generated by the first evaluating device 70*a* can be converted directly and, where appropriate, even linearly by the first control device 174*a* into adjusting commands for the first pressure source 98*a*.

The central regions 82 of the focusing optics 28, which are registered by the measuring light 63*a*, have, on the other hand, been assigned to the second adaptive mirror 90*b*. Since the central regions 82 have been directly exposed to the laser radiation 40, they deform particularly severely. This leads in general to a rotationally symmetrical but overall aspherical deformation of the lenses 30, 32 and also of the protective discs 43, 45.

Accordingly, the second adaptive mirror 90*b*, which has been assigned to the central regions, also deforms, as a consequence of the thickness profile shown in FIG. 15, mainly in a central region which corresponds to the central regions 82 of the focusing optics 28. In this way, the measuring signals generated by the second evaluating device 70*b* can also be converted directly and, where appropriate, even linearly by the second control device 174*b* into adjusting commands for the second pressure source 98*b*.

Since the adaptive mirrors 90*a*, 90*b* have not been exposed to the measuring light 63*a*, 63*a*', the compensating axial displacement of the focal spot 22, which is generated by the deformation of the adaptive mirrors 90*a*, 90*b*, cannot be monitored directly by the measuring device 46. For this reason, a control loop cannot be realised with the set-up shown in FIG. 13. Nevertheless, the axial position of the focal spot 22 remains stable during operation of the laser machining apparatus, since the connection between the measuring signals and the control signals can easily be determined by a calibration measurement.

The invention claimed is:

1. A machining head for a laser machining apparatus that is configured to machining of workpieces with laser radiation, said machining head comprising:
   focusing optics configured to focus laser radiation guided to the machining head in a focal spot,
   a measuring device configured to measure changes in the focal length of the focusing optics, wherein the measuring device comprises
      a light source configured to generate measuring light that is different from the laser radiation,
      a light-exit window from which the measuring light emerges during operation of the measuring device, the light-exit window being imaged, with the assistance of the focusing optics or a part thereof, onto a reflecting surface which is arranged to be stationary relative to the light-exit window and the focusing optics and is not part of the focusing optics,
      a light sensor which is configured to register measuring light that has emerged from the light-exit window, has passed through the focusing optics or the part thereof, was reflected on the reflecting surface, and has again passed through the focusing optics or the part thereof, wherein the measuring light impinges at least partly onto regions of optical surfaces of the focusing optics onto which the laser radiation also impinges,
      an evaluating device which is configured to ascertain a change in the focal length of the focusing optics from measuring signals provided by the light sensor.

2. The machining head of claim 1, wherein the reflecting surface is plane and is oriented to be perpendicular to an optical axis of the measuring light.

3. The machining head of claim 1, wherein an optical axis of the measuring light passes through the focusing optics or the part thereof at an angle different from zero with respect to an optical axis of the focusing optics.

4. The machining head of claim 1, wherein the measuring light passes through all optical surfaces of the focusing optics.

5. The machining head of claim 1, wherein the light source is configured to generate, simultaneously or in succession, measuring light having at least two different wavelengths, and wherein the evaluating device is configured to ascertain the focal length of the focusing optics from an intensity of the measuring light detected by the light sensor, thereby taking account of the chromatic longitudinal aberration of the focusing optics or of the part thereof.

6. The machining head of claim 5, wherein the light source is a broadband light source, and wherein the light sensor is configured to detect measuring light in a wavelength-dependent manner.

7. The machining head of claim 1, wherein the measuring device is configured to direct a first measuring-light bundle and a second measuring-light bundle onto different regions of an optical surface of the focusing optics, and to evaluate the first and second measuring-light bundles independently of one another.

8. The machining head of claim 7, wherein the second measuring-light bundle is capable of being directed onto a central region of the optical surface, which contains the optical axis of the focusing optics, and the first measuring-light bundle is capable of being directed onto a marginal region of the optical surface surrounding the central region.

9. A laser machining apparatus comprising a laser radiation source, a machining head of claim 7, and a beam-feeding device which is arranged in an optical path between the laser radiation source and the machining head and which feeds laser radiation generated by the laser radiation source to the machining head, wherein the evaluating device is configured
   to determine, on the basis of measured values that were obtained exclusively by using the first measuring-light bundle, a control signal for a first adjusting element configured to change an optical effect of a first optical element in such a way that if the first adjusting element is driven with the control signal, the first optical element at least partly compensates a change in the focal length of the focusing optics measured by the measuring device, and
   to determine, on the basis of measured values that were obtained exclusively by using the second measuring-light bundle, a control signal for a second adjusting element which is different from the first adjusting element and which is configured to change an optical effect of a second optical element in such a way that if the second adjusting element is driven with the control signal, the second optical element at least partly compensates a change in the focal length of the focusing optics measured by the measuring device,
   wherein the first optical element and the second optical element are arranged in the beam path of the laser radiation between the laser radiation source and the focal spot.

10. The laser machining apparatus of claim 9, wherein
    the first optical element is a first adaptive mirror,
    the second optical element is a second adaptive mirror,
    with the first adjusting element a deformation can be achieved exclusively of a part of the first adaptive mirror (90a) onto which a first portion of a total intensity of the laser radiation impinges,
    with the second adjusting element a deformation can be achieved of a part of the second adaptive mirror onto which a second portion of the total intensity of the laser radiation impinges, which is smaller than the first portion.

11. The laser machining apparatus of claim 10, wherein the second adaptive mirror includes a mirror substrate, the mirror substrate bounding a pressure chamber and deforming depending on an internal pressure in the pressure chamber, and wherein the mirror substrate has a thickness which varies at least within a region of the mirror substrate that bounds the pressure chamber.

12. The laser machining apparatus of claim 11, wherein, in said region, the mirror substrate has a rotationally symmetrical thickness profile which is determined in such a manner that the mirror substrate deforms aspherically in the event of a change in the internal pressure.

13. The laser machining apparatus of claim 11, wherein the first adaptive mirror includes a mirror substrate, the mirror substrate bounding a pressure chamber and deforming depending on the internal pressure in the pressure chamber, and wherein the mirror substrate has a thickness that is constant within a region of the mirror substrate that bounds the pressure chamber.

14. The machining head of claim 1, wherein the evaluating device is configured to determine a control signal for an adjusting element, which is configured to change an optical effect of an optical element, in such a way that if the adjusting element is driven with the control signal, the optical element at least partly compensates a change in the focal length of the focusing optics measured by the measuring device.

15. The machining head of claim 1, wherein the focusing optics include at least one protective disc that is transparent to the laser radiation and to the measuring light, said disk being arranged both in a beam path of the measuring light and in a beam path of the laser radiation.

16. The machining head of claim 15, comprising a memory associated with the evaluating device, wherein changes in the focal length at several points in time after the machining head has been put into operation are stored, and wherein the evaluating device is configured to infer, by comparing stored changes, a degree of a contamination or a destruction of the protective disc.

17. The machining head of claim 1, wherein in a beam path of the measuring light at least one optical element is arranged that is exposed to any laser radiation but contributes to the imaging of the light-exit window onto the reflecting surface.

18. A process for measuring changes in a focal length of focusing optics contained in a machining head of a laser machining apparatus that is configured to machine workpieces with laser radiation, wherein the focusing optics focus laser radiation fed to the machining head in a focal spot, comprising the following steps:

a) generating measuring light that is different from the laser radiation;

b) imaging a light-exit window, from which measuring light emerges, at least with the assistance of the focusing optics or a part thereof, onto a reflecting surface which is arranged to be stationary relative to the light-exit window and the focusing optics and is not part of the focusing optics;

c) detecting measuring light that has emerged from the light-exit window, has passed through the focusing optics or the part thereof, was reflected on the reflecting surface, and has again passed through the focusing optics or the part thereof, with a light sensor, wherein the measuring light at least partly impinges onto regions of optical surfaces of the focusing optics onto which the laser radiation also impinges;

d) ascertaining a change in the focal length of the focusing optics from measuring signals provided by the light sensor.

* * * * *